United States Patent
Pereira Junior et al.

(10) Patent No.: US 8,052,876 B2
(45) Date of Patent: Nov. 8, 2011

(54) PROCESS FOR TREATING EFFLUENTS FROM THE OIL INDUSTRY FOR DISCHARGE OR REUTILIZATION

(75) Inventors: Oswaldo de Aquino Pereira Junior, Rio de Janeiro (BR); Marcel Vasconcelos Melo, Niteroi (BR); Agenor Jacinto Junior, Niteroi (BR)

(73) Assignee: Petroleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 12/265,777

(22) Filed: Nov. 6, 2008

(65) Prior Publication Data
US 2009/0134093 A1    May 28, 2009

(30) Foreign Application Priority Data
Nov. 9, 2007 (BR) .................................. 0704075

(51) Int. Cl.
*C02F 1/72* (2006.01)
*C02F 1/78* (2006.01)

(52) U.S. Cl. ............................ 210/756; 210/759
(58) Field of Classification Search .......... 210/747, 210/753, 754, 756, 759, 170.04, 200, 201, 210/202, 242.2, 252, 257.1, 258, 259, 721, 210/708, 799, DIG. 5; 175/206, 207
See application file for complete search history.

(56) References Cited

U.S. PATENT DOCUMENTS

| | | | |
|---|---|---|---|
| 5,207,920 A | 5/1993 | Jones | |
| 5,236,590 A * | 8/1993 | Sciamanna et al. | 210/639 |
| 6,024,882 A * | 2/2000 | McNeilly et al. | 210/759 |
| 7,029,589 B2 * | 4/2006 | McGinness | 210/758 |

FOREIGN PATENT DOCUMENTS
WO   WO 96/12678   5/1996

OTHER PUBLICATIONS

E. Carissimi et al., The Flocs Generator Reactor—FGR: A New Basis for Flocculation and Solid-Liquid Separation, Int. J. Miner. Process. 75:237-247 (2005).

* cited by examiner

*Primary Examiner* — Nam Nguyen
*Assistant Examiner* — Lucas Stelling
(74) *Attorney, Agent, or Firm* — Nixon & Vanderhye P.C.

(57) ABSTRACT

A process is described for treating effluents from oil production units for discharge or reutilization, to remove oil and other soluble toxic contaminants such as sulphides, benzenes, toluenes, xylenes and polyaromatic hydrocarbons, before discharging or reusing this effluent, especially in an offshore environment. This process for effluent treatment includes a step of changing the thermodynamic equilibrium conditions of an oil-in-water emulsion, followed by a step of separating the oil and the water, to be carried out in an offshore oil production unit.

9 Claims, 1 Drawing Sheet

PROCESS FOR TREATING EFFLUENTS FROM THE OIL INDUSTRY FOR DISCHARGE OR REUTILIZATION

This application claims priority to Brazil Application No. PI 0704075-0, filed 9 Nov. 2007, the entire contents of which are hereby incorporated by reference.

FIELD OF THE INVENTION

The present invention pertains to the field of processes for treating effluents from oil production units. More specifically, the present invention describes a process for treating effluents to remove oil and other soluble toxic contaminants such as sulphides, benzenes, toluenes, xylenes and polyaromatic hydrocarbons, before discharging or reusing this effluent especially in an offshore environment.

BASIS OF THE INVENTION

A major problem in the oil industry relates to the final destination of the oily water produced alongside the oil, and of the liquids from washing of equipment, instruments, production units and storage facilities etc., especially in an offshore environment.

Both the oily water produced, and the liquids from washing (considered to be effluents from oil production units) usually contain in addition to oil, a series of soluble toxic contaminants such as sulphides, benzenes, toluenes, xylenes and polyaromatic hydrocarbons.

These effluents can be discharged into the open sea or injected into injection wells in order to increase the recovery of the crude oil contained in a reservoir. However, before this, they need to be treated, both for environmental reasons linked to discharging liquids into the open sea, and due to the process requirements for injecting fluids into injection wells.

Worldwide, protecting the environment is increasingly becoming a topic of discussion. Legislation on this topic is imposing increasingly rigid limits on discharging these substances into the sea. For example, in Brazil the limit for the concentration of oil in effluents discharged into the sea is 20 mg/L, while in other parts of the world the limit is 40 mg/L. Toxic contaminants must also be extracted from the water produced before discharging it into the sea, although not all countries have specific legislation defining the maximum limits for concentrations of these contaminants in effluents discarded in the sea. The current Brazilian legislation still does not require the removal of these contaminants before discharge into the sea, but this is already a requirement in the North Sea.

Pretreatment of liquids to be injected into the reservoir is important in order not to decrease the ease of injection of this liquid into the reservoir. The presence of oil and solids in the water produced contributes to the formation of deposits in the reservoir. The deposits can cause a loss of injectability, resulting in a decrease in the flow of crude oil.

There are some difficulties in treating effluents from an oil production unit, and these include the presence of stabilizers of oil-in-water emulsions. These stabilizers include ferrous sulphide (FeS), which is a product of corrosion by $H_2S$ in piping and production equipment. $H_2S$ is very common in offshore oil reservoirs, and this increases the corrosiveness of the water produced alongside the oil contained in these reservoirs.

The influence of FeS on the stability of oil-in-water emulsions is relevant, because when in colloidal form (particles of nanometer size), it migrates to the oil-water interface, forming a physical and electrical barrier, which hinders contact between the oil droplets, inhibiting coalescence and promoting greater stability of the oil-in-water emulsion. In addition, the duration of contact of the oil-water interface significantly affects emulsion stability. As the oil-water interface "ages", the adsorption of emulsion-forming substances (such as asphaltenes and aromatic polynuclear compounds) becomes complete, and the rigidity of the pellicle increases. As a result, an "aged" emulsion associated with stabilizers in colloidal form makes the oil effluent highly stable and difficult to treat by conventional techniques.

An example of treatment of liquid from the oil industry currently used by organizations is described in Brazilian patent document PI 9509389. The aforementioned document describes a method for treating water contaminated with oil in crude oil production units. The method described uses mechanical agitation and two chemical substances to promote flocculation and a quantity of air to cause flotation of the contaminating material. The method described is thus complex to operate, a large quantity of gas is dissolved in the flux, and considerable investment is needed in order to implement the method of treatment. In addition, all this conventional treatment only removes solids and dispersed oil, allowing all of the toxic contaminants present in the effluent to pass into the environment, due to the presence of soluble derivatives, which are not removed by the aforementioned technique.

US patent document U.S. Pat. No. 5,207,920 describes equipment for separating fluids or particles of fluids in solution by the action of a centrifugal force, together with the action of a gas for flotation. Said equipment promotes the separation of dispersed oil droplets with the minimum movement of said droplets, so as to minimize the effects of the functional mechanism. Although this technique represents an advance over the prior art, in that it employs compact equipment with no moving parts for use in an offshore environment, it also does not consider the removal of soluble toxic contaminants in the effluent and is not able to treat satisfactorily oil-in-water emulsions stabilized by ferrous sulphide colloids.

Therefore, the methods and equipment representing the state of the art are known to have the drawback of not eliminating soluble toxic contaminants such as sulphides, benzenes, toluenes, xylenes and polyaromatic hydrocarbons, present in effluents from oil production units, especially in an offshore environment. In addition, due to the high stability of the oil-in-water emulsions due to the presence of colloidal material and finely divided particles, conventional treatment techniques are unable to remove satisfactorily the oil dispersed in these effluents from oil production units, and especially in older installations, colloidal material resulting from corrosion, such as ferrous sulphide and ferrous oxide, are mainly responsible for this effect.

SUMMARY OF THE INVENTION

The present invention describes a process for treating effluents from oil production units for discharge or reutilization, to remove oil and other soluble toxic contaminants such as sulphides, benzenes, toluenes, xylenes and polyaromatic hydrocarbons, before discharging or reusing this effluent especially in an offshore environment.

This process for effluent treatment includes a step of changing the equilibrium thermodynamic conditions of an oil-in-water emulsion, followed by a step of separating the oil and the water, to be carried out in an offshore oil production unit.

The change in the thermodynamic equilibrium conditions of the emulsion is brought about by one or more redox reaction(s) by adding specific oxidizing agents (hydrogen peroxide ($H_2O_2$) or sodium hypochlorite (NaClO), for example).

Together with the change in the thermodynamic equilibrium conditions, the soluble toxic contaminants derived from the oil are also oxidized, and they migrate into the oil phase of the treated effluent and are separated together with the oil, decreasing the final toxicity of the effluent. This process for effluent treatment minimizes the effect on pollution, decreasing operating costs and the risk of environmental impact.

BRIEF DESCRIPTION OF THE DRAWINGS

The characteristics of the process for treating effluents from oil production units for discharge or reutilization, which is the object of the present invention, will be better appreciated from the detailed description below, merely for the purposes of illustration, associated with the drawing referred to below, which is an integral part of this report.

DETAILED DESCRIPTION OF THE INVENTION

Figure 1:
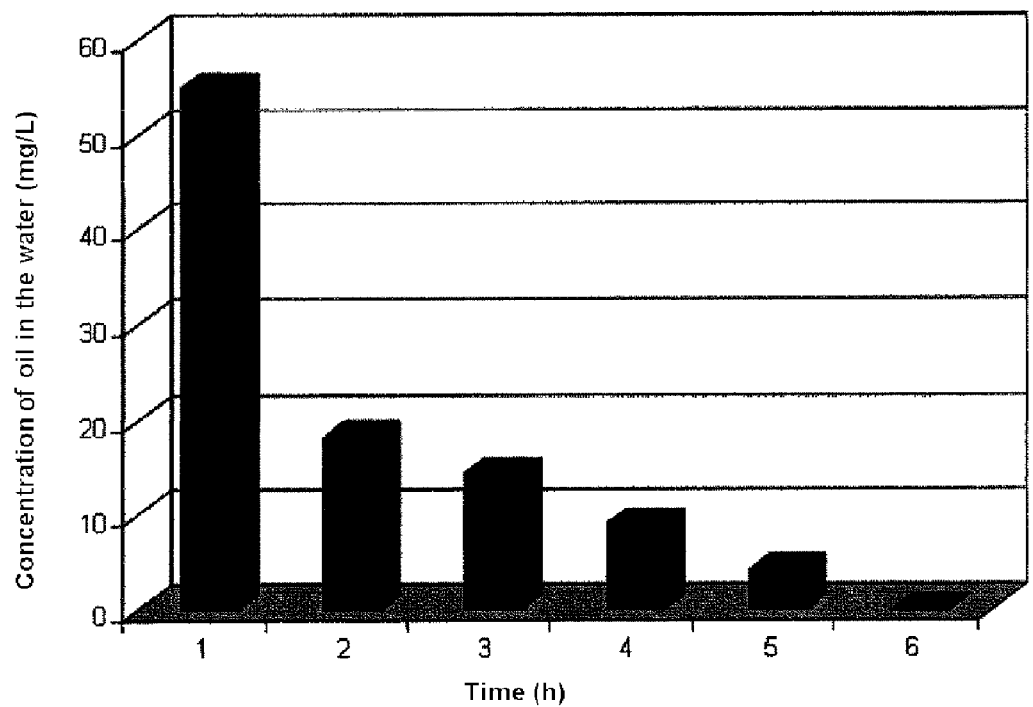
FIG. 1 attached illustrates the analysis of the concentration of oil in water before and after adding an oxidizing agent, against residence time, for water produced in an offshore oil production unit in a first oil production field, designated herein "platform A".

The process for treating effluents from oil production units for discharge or reutilization, which is the object of the present invention, describes a process for effluent treatment to remove oil and other soluble toxic contaminants such as sulphides, benzenes, toluenes, xylenes and polyaromatic hydrocarbons, before discharging or reusing this effluent especially in an offshore environment.

This process for effluent treatment includes a step of changing the thermodynamic equilibrium conditions of an oil-in-water emulsion, followed by a step of separating the oil and the water, to be carried out in an offshore oil production unit.

The principal substance which complicates treatment of effluents from oil production units by traditional methods is ferrous sulphide (FeS). As mentioned above, ferrous sulphide in colloid form is responsible for high stability in the oil-in-water emulsions present in effluents from oil production units.

According to the process for treatment proposed by the present invention ferrous sulphide (FeS) can change from colloidal form to a soluble form by reacting with oxidizing agents ($H_2O_2$ or NaClO) by reaction 1 or 2 below.

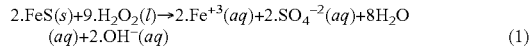

(1)

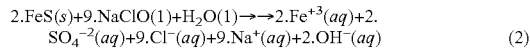

(2)

The change in the thermodynamic equilibrium conditions allows the oil droplets to coalesce by destabilizing the emulsion and separating the phases, thereby decreasing the concentration of oil in the effluent.

In addition to decreasing the concentration of oil in the effluent, the change in the thermodynamic equilibrium conditions also promotes the oxidation of the soluble toxic contaminants derived from the oil, which migrate into the oil phase of the treated effluent and are separated together with the oil, thus decreasing the final toxicity of the effluent.

The steps of the process for treating effluents from oil production units, proposed by this invention, include:

a) pumping an effluent, containing an oil-in-water emulsion and soluble toxic contaminants, from a first storage tank via a first supply line;

b) pumping an oxidizing agent from a second storage tank via a second supply line;

c) directing both the first supply line and the second supply line into a third supply line in order to promote first mixing between the effluent and the oxidizing agent;

d) transferring the mixture of the effluent and the oxidizing agent from the third supply line to a mixing device, and preferably a pneumatic flocculator;

e) promoting agitation of the mixture of the effluent and the oxidizing agent in order to bring about at least a redox reaction and the resulting destabilization of the oil-in-water emulsion;

f) directing the contents of the mixing device via a transfer line to a separating device, and preferably a floatation device;

g) separating the treated effluent by means of the separating device into two distinct phases: a first phase containing predominantly water and a second phase containing oil and the soluble toxic contaminants.

The pneumatic flocculator mixing device suggested in the present invention is a static helical mixer which receives an injection of natural gas to promote the turbulence needed for mixing the effluent and the oxidizing agent. Injecting natural gas, in addition to giving good mixing, also causes the formation of aggregates of bubbles of natural gas and oil droplets destabilized by the addition of the oxidizing agent.

The type of oxidizing agent ($H_2O_2$ or NaClO) is selected by bench tests on the offshore unit itself, in accordance with the composition of the effluent, previously characterized by laboratory tests. Chemical and physico-chemical characterization serves to identify the concentration of solids (suspended and colloidal) of oil and of soluble toxic contaminants in the effluent to be treated. The bench tests not only define the oxidizing agent to be used, but also indicate the ideal quantity of this agent for treating the effluent.

The quantity of oxidizing agent and the ideal reaction time for treating the effluent can be adjusted on the basis of pilot scale tests on the offshore unit itself. For this purpose, a fraction of the effluent is subjected to the treatment process described above, with different quantities of oxidizing agent close to the ideal quantity defined in the bench tests.

In these pilot-scale tests, samples are taken at the inlet (effluent to be treated) and at the outlet from the process (treated water), in order to measure the concentration of oil and contaminants present and thus evaluate the performance of the oxidizing agent under practical operating conditions. If necessary, the ideal quantity of oxidizing agent can then be adjusted.

The floatation type separation device suggested in the present invention, which is used for separating the aggregates of bubbles of natural gas and destabilized oil droplets, can be replaced by conventional degassing tanks, or gravity tanks adapted for separating gas. In the absence of such equipment, or due to lack of space in the offshore unit, cylindrical cyclone separators can be designed for taking the effluent to be treated. In floatation type separators the phase rich in oil and gas is removed via the upper outlet, while the phase containing mainly water is removed at the bottom of the device.

The treatment process of the present invention uses equipment that could perfectly well be used on an offshore unit, without interfering with the other facilities needed for offshore oil production.

Due to its low levels of concentration of oil and soluble toxic contaminants, the treated water can be used for a variety of purposes, including safe discharge into the open sea and injection into fluid injection wells for recovering oil. Another possible use for water treated by the process described herein is for irrigating non-food crops on-shore, such as castor beans, for example.

The present invention will be illustrated by an example, which should not be considered limiting.

EXAMPLE

The process for treating effluents from oil production units for discharge or reutilization was tested in a pilot plant in an offshore oil production unit in a first oil production field, designated hereafter as "platform A", and on bench scale in an offshore oil production unit in a second oil production field, designated in this example "platform B".

Soluble toxic contaminants were monitored for efficiency of removal thereof by chemical analyses specific for each contaminant, using the methods currently used and recommended by the international scientific community.

FIG. 1 compares analyses of the concentration of oil dispersed in the untreated water produced by "platform A", before and after adding the oxidizing agent hydrogen peroxide against residence time. We note that after the aforementioned addition (time 1 hour) there was a drop in the concentration of oil in the water produced (time 2, 3, 4 and 5 hours), reaching concentrations close to zero (time 6 hours). This drop confirms the oxidation of colloidal stabilizers (mainly ferrous sulphide), thereby allowing rapid separation of the oil phase by gravity.

Table 1 also compares the quality of the water produced by "platform A" as regards the concentration of benzenes, toluenes and xylenes before and after treatment with hydrogen peroxide. A decrease in the concentration of these substances is also noted in the water after treatment, showing decreased toxicity. In Table 1, Sample 1 is the effluent before treatment, and Sample 2 is the treated water.

TABLE 1

| METHOD | | SAMPLES | |
| --- | --- | --- | --- |
| Test data Test | LDM | Sample 1 Result (mug/L) | Sample 2 Result (mug/L) |
| Benzene | 0.2 | 135.8 | ND |
| Toluene | 0.1 | 9.2 | 0.2J |
| Ethylbenzene | 0.1 | 5.7 | ND |
| m + p-xylene | 0.1 | 5.4 | ND |
| o-xylene | 0.1 | 4.6 | ND |

In Table 1, "ND" indicates that the toxic contaminant analysed was not detected in the sample. "J" indicates that the analyte was detected but was below the limit of detection of the apparatus (3.3 LDMs). And "LDM" represents the limit of detection of the method.

Table 2 compares analyses of the concentration of oil dispersed in the water produced by "platform B", before and after adding the oxidizing agent sodium hypochlorite against residence time. As in the previous case, the addition of an oxidizing agent, in this case sodium hypochlorite, has a decisive role in the chemical destabilization of the emulsion, allowing treatment of the water with low residence times. As regards Table 2, it should be noted that the concentration of oil in the untreated water was 57 ppm.

TABLE 2

| Concentration of sodium hypochlorite (ppm) | Concentration of oil in the water (ppm) | | | |
| --- | --- | --- | --- | --- |
| | 0 hours | 1 hour | 2 hours | 4 hours |
| 50 | 24.7 | 4.2 | Zero | — |
| 150 | 16.0 | 2.6 | Zero | — |
| 300 | 11.7 | 1.6 | Zero | 0.5 |
| 500 | 4.5 | 1.6 | Zero | — |

In addition, Table 3 compares the quality of the water produced by "platform B" as regards sulphide concentration, before (sample 1) and after treatment (other samples) using hydrogen peroxide or sodium hypochlorite as oxidizing agents. The samples were analysed 60 minutes after adding the oxidizing agent. A decrease in the concentration of these substances is also noted in the water after treatment, showing decreased toxicity.

TABLE 3

| No. | SAMPLE | SULPHIDE (mg/L) |
| --- | --- | --- |
| 1 | Water as produced (untreated) | 3.6 |
| 2 | Water produced + $H_2O_2$ 20 ppm | 1.6 |
| 3 | Water produced + $H_2O_2$ 40 ppm | 1.6 |
| 4 | Water produced + $H_2O_2$ 60 ppm | 1.2 |
| 5 | Water produced + $H_2O_2$ 80 ppm | 0.84 |
| 6 | Water produced + $H_2O_2$ 100 ppm | 0.24 |
| 7 | Water produced + $H_2O_2$ 120 ppm | 0.63 |
| 8 | Water produced + $H_2O_2$ 150 ppm | 0.66 |
| 9 | Water produced + hypochlorite 50 ppm | 0.94 |
| 10 | Water produced + hypochlorite 300 ppm | 0.55 |
| 11 | Water produced + hypochlorite 500 ppm | 0.72 |

The description presented so far of the process for treating effluents from oil production units for discharge or reutilization, which is the object of the present invention, should be considered to be only one possible embodiment, and any specific characteristics introduced therein should be understood only as having been written in order to aid understanding. They should, therefore, not be regarded as in any way defining the invention, which is defined by the scope of the claims below.

The invention claimed is:

1. Process for treating effluents from oil production units to remove oil and other soluble toxic contaminants, before discharging or reusing this effluent, in an offshore environment, comprising the following steps:
   a) pumping an effluent, containing an oil-in water emulsion and soluble toxic contaminants, from a first storage tank via a first supply line;
   b) pumping an oxidizing agent from a second storage tank via a second supply line, wherein the oxidizing agent consists of hydrogen peroxide ($H_2O_2$) or sodium hypochlorite (NaClO);
   c) directing both the first supply line and the second supply line into a third supply line in order to promote first mixing between the effluent and the oxidizing agent;
   d) transferring the mixture of the effluent and the oxidizing agent from the third supply line to a mixing device;
   e) promoting agitation of the mixture of the effluent and the oxidizing agent in order to bring about at least a redox reaction and the resulting destabilization of the oil-in-water emulsion;
   f) directing the contents of the mixing device via a transfer line to a separating device;

g) separating the treated effluent, by means of the separating device, into two distinct phases: a first phase containing predominantly water and a second phase containing oil and the soluble toxic contaminants.

2. Process for treating effluents from oil production units according to claim 1, wherein the mixing device comprises a pneumatic flocculator.

3. Process for treating effluents from oil production units according to claim 1, wherein the soluble toxic contaminants comprise at least one of sulphides, benzenes, toluenes, xylenes and polyaromatic hydrocarbons.

4. Process for treating effluents from oil production units according to claim 1, wherein the oxidizing agent consists of hydrogen peroxide ($H_2O_2$).

5. Process for treating effluents from oil production units according to claim 1, wherein the oxidizing agent consists of sodium hypochlorite (NaClO).

6. Process for treating effluents from oil production units according to claim 1, wherein the separating device consist of flotation devices.

7. Process for treating effluents from oil production units according to claim 1, wherein the separating device consist of conventional degassing tanks.

8. Process for treating effluents from oil production units according to claim 1, wherein the separating device consists of gravity tanks adapted for separating gas.

9. Process for treating effluents from oil production units according to claim 1, wherein the separating device consist of cylindrical cyclone separators.

* * * * *